United States Patent [19]

Steigerwald

[11] 4,323,962
[45] Apr. 6, 1982

[54] HIGH EFFICIENCY RECTIFIER WITH MULTIPLE OUTPUTS

[75] Inventor: Robert L. Steigerwald, Scotia, N.Y.

[73] Assignee: General Electric Company, Schenectady, N.Y.

[21] Appl. No.: 230,927

[22] Filed: Feb. 2, 1981

[51] Int. Cl.³ .............................................. H02M 7/217
[52] U.S. Cl. ....................................... 363/127; 307/34; 323/271; 323/290; 323/902
[58] Field of Search ............................. 323/266–268, 323/271, 272, 282, 290, 320, 902; 363/127, 134; 307/31, 33, 34

[56] References Cited

U.S. PATENT DOCUMENTS 3,582,758  6/1971  Gunn ................................... 363/127
3,909,700  9/1975  Ferro .............................. 363/127 X
3,940,682  2/1976  Park et al. ........................... 363/127
4,187,458  2/1980  Milberger et al. .............. 323/290 X

FOREIGN PATENT DOCUMENTS 2459868  6/1976  Fed. Rep. of Germany ...... 363/134
481891   9/1975  U.S.S.R. ............................. 323/290

Primary Examiner—A. D. Pellinen
Attorney, Agent, or Firm—William H. Steinberg; James C. Davis, Jr.; Marvin Snyder

[57] ABSTRACT

A half-wave and a full-wave rectifier using transistors as rectifying elements have independently controlled multiple output voltages obtained from a single power supply. The transistor used as a rectifying element has its turn-on controlled thus allowing voltage control by phase control action.

2 Claims, 2 Drawing Figures

HIGH EFFICIENCY RECTIFIER WITH MULTIPLE OUTPUTS

This invention relates to high efficiency rectifiers employing transistors as the controlled rectifying elements.

Independent control of several output voltages is often accomplished by using series path regulators for each output voltage to be supplied. If the poor efficiency of series path regulators cannot be tolerated, then the transformer secondaries can be tightly coupled to the primary windings and the primary voltage regulated. The regulation resulting from this approach is not as good as the series regulator solution due to transformer leakage inductance as well as the usual coupling between secondaries.

It is an object of the present invention to independently control in an efficient manner several rectified output voltages obtained from independent windings on a common transformer where the common transformer is excited from a single power source.

SUMMARY OF THE INVENTION

In one embodiment of the present invention a half-wave rectifier employing a transistor as the rectifying element is shown. A very low forward drop which is at least as low as the forward drop of the Schotky rectifier can be established by driving the transistor into deep saturation. At least one half-wave rectifier is coupled to a corresponding independent winding on a common transformer. The common transformer is excited by a single source. The transistor used as a rectifying element has its turn-on controlled thus allowing voltage control by phase control action. Independent control of the multiple output voltages therefore can be obtained from a single power source such as a converter or inverter.

In another embodiment, a full-wave rectifier employing transistors as the rectifying elements is shown. At least one full-wave rectifier is coupled to a corresponding independent winding on a common transformer. The common transformer is excited by a single source. The transistors used as rectifying elements have their turn-on time phase controlled, allowing independent control of multiple output voltages.

BRIEF DESCRIPTION OF THE DRAWING

While the specification concludes with claims particularly pointing out and distinctly claiming the present invention, the objects and advantages can be more readily ascertained from the following description of a preferred embodiment when read in conjunction with the accompanying drawing in which:

DETAILED DESCRIPTION OF THE DRAWING

Figure 1:
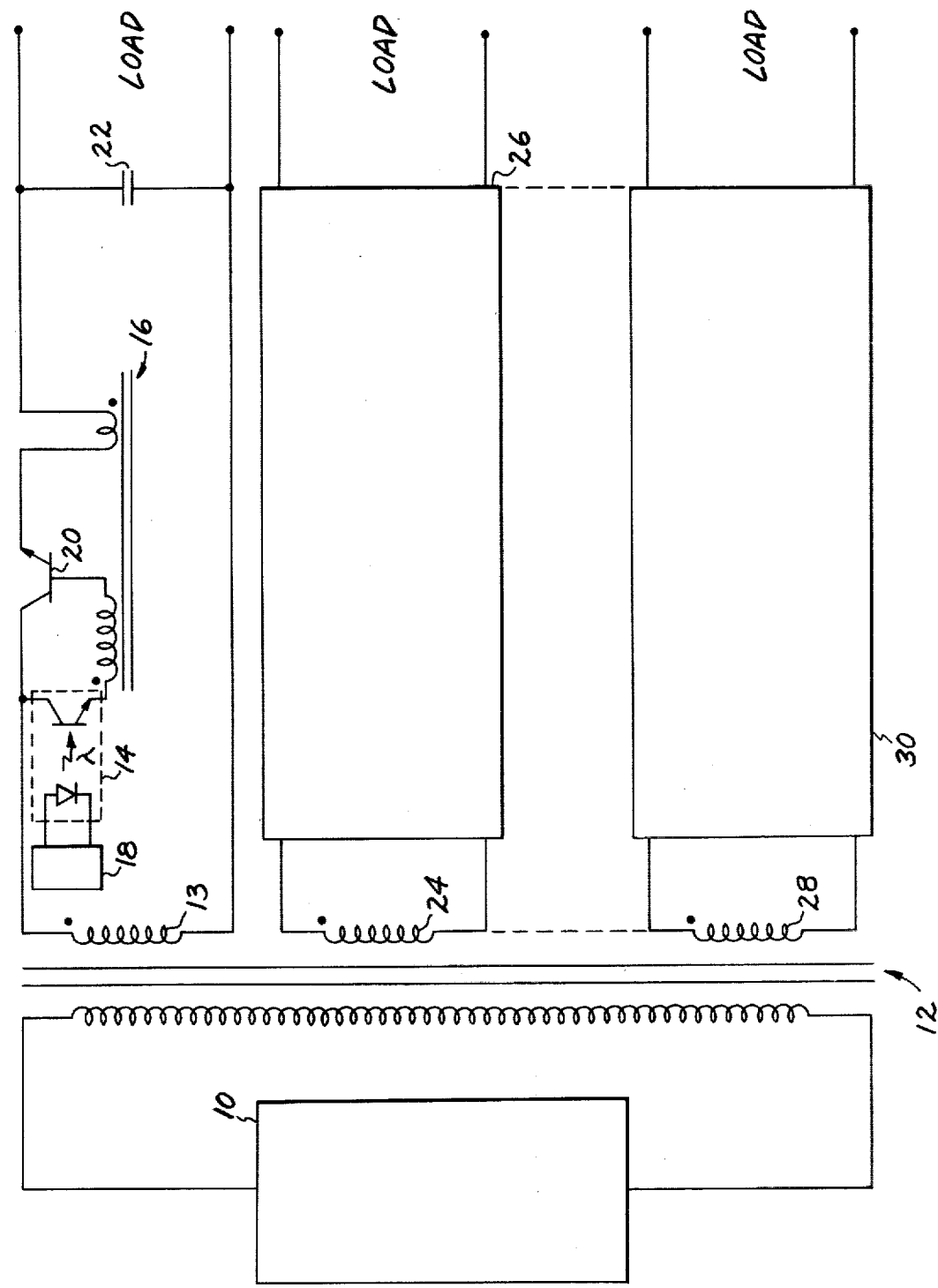
FIG. 1 is a part schematic part block diagram representation of a high efficiency half-wave, controlled transistor rectifier, having multiple independently controlled outputs in accordance with the present invention.

Referring now to FIG. 1, a source of alternating power 10 such as an inverter or converter is connected across the primary winding of a transformer 12 having multiple secondary windings 13, 24, and 28 wound on a common core. One side of a first secondary winding 13 of transformer 12 is connected to one side of a load (not shown). A controllable switch shown in the figure as a phototransistor 14 has its collector connected to the other side of the secondary winding 13 of transformer 12. The emitter of phototransistor 14 is connected to one side of the secondary winding of a current transformer 16 which could typically be a small ferrite toroid for applications in the 20 kHz range. The light emitting diode of phototransistor 14 is connected to a phase control regulator 18 which controls the point in the AC wave supplied by the source 10 that power is supplied to the diode of the phototransistor. A transistor 20 which can be a commercially available silicon junction transistor or for high current low voltage applications a high gain low saturation voltage transistor can be specially designed, has its base connected to the other side of the secondary winding of current transformer 16. The collector of transistor 20 is connected to the collector of phototransistor 14. The primary winding of the current transformer is connected between the other side of the load and the emitter of transistor 20. A filter capacitor 22 is connected across the load terminals. It is also possible to connect the transistor 20 in an inverted mode as discussed in U.S. Pat. No. 3,940,682 entitled "Rectifier Circuit Using Transistor As Rectifying Elements", J. Park et al inventors and assigned to the General Electric Company. In the inverted mode voltage blocking is performed by the collector-base junction of the transistor rather than the emitter-base junction, the normal collector and emitter current flow directions being reversed. The primary winding of the current transformer 16 could also be located between the secondary winding 13 and the phototransistor 14 emitter as long as load current passes through the primary winding when transistor 20 is conducting. The primary and secondary windings of current transformer 16 have a relative polarity indicated by dots in accordance with the convention that the end of the secondary winding connected to the emitter of phototransistor 14 has the same polarity as the end of the primary winding connected to the load.

A second secondary winding 24 has connected across it in block 26 the same components as are shown connected to a phase control regulator, a transistor, a current transformer, and a filter capacitor, all in the same configuration as the components connected to the secondary winding 13. Similarly, for the $n^{th}$ secondary winding 28 the block 30 contains the same components as are in block 26.

Figure 2:
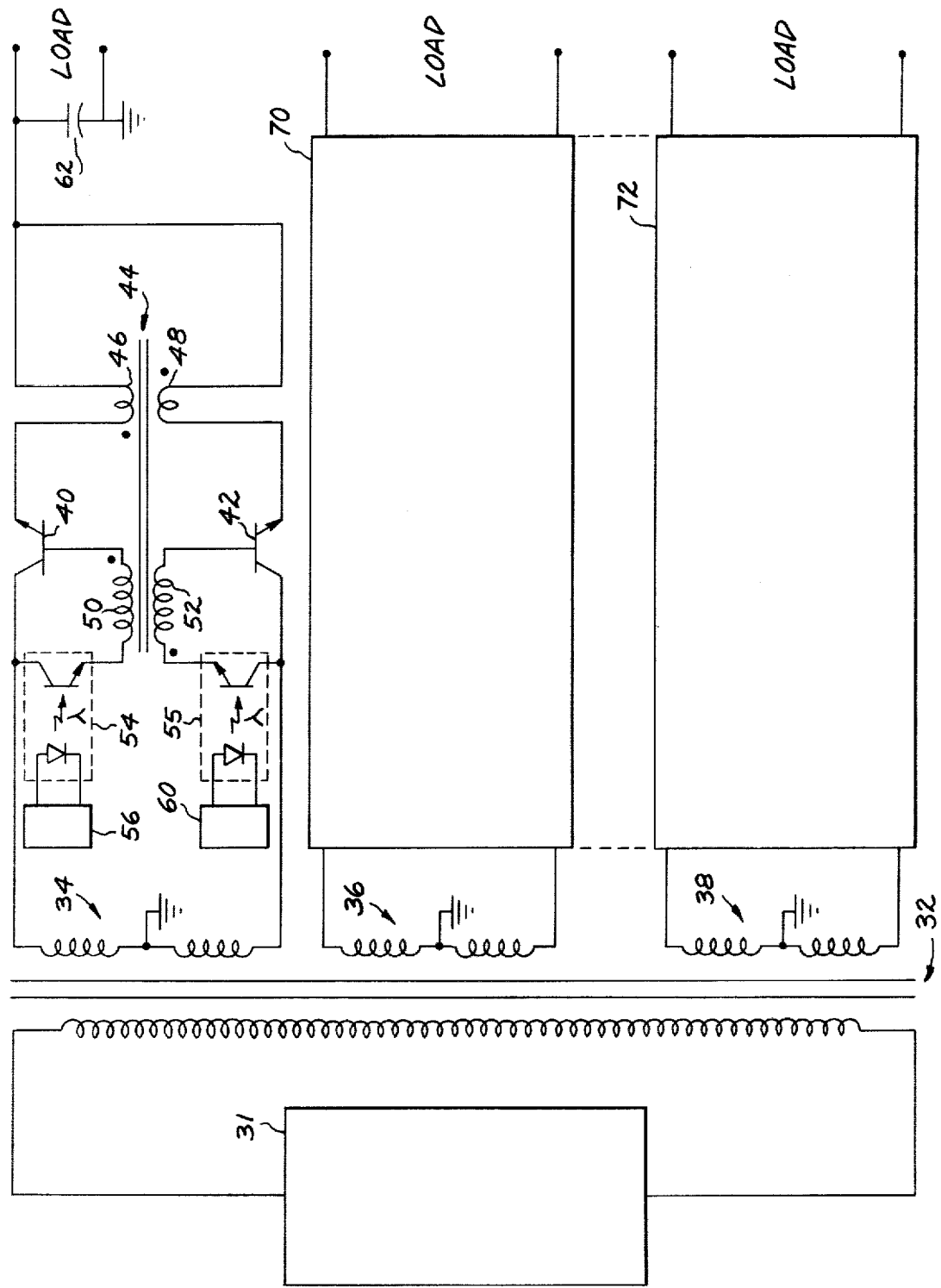
FIG. 2 is a part schematic part block diagram representation of a high efficiency full-wave, controlled transistor rectifier, having multiple independently controlled outputs in accordance with the present invention.

Referring now to FIG. 2 a high efficiency fullwave, controlled transistor rectifier, having multiple independently controlled outputs is shown. A source of alternating power 31 such as an inverter or converter is connected across the primary winding of a transformer 32. Transformer 32 has multiple secondary windings 34, 36, and 38 which are magnetically coupled by the core of transformer 32. Each of the secondary windings 34, 36 and 38 is center-tapped. One end of secondary winding 34 is connected to the collector of transistor 40. The other end of the winding is connected to the collector of transistor 42. Transistor 40 and 42 can be commercially available silicon junction transistors or for high current low voltage applications a high gain, low saturation voltage transistors can be specially designed. A current transformer 44 has 2 primary windings 46 and 48 and two secondary windings 50 and 52 on a common core which can typically be a small ferrite toroid for applications in the 20 kHz range. The primary winding 48 and secondary winding 52 are associated with transistor 42. Two controllable switches are shown in FIG. 2 as a phototransistor 54 and a phototransistor 55. Phototransistor 54 has its collector connected to the collector of transistor 40 and its emitter connected to one end of secondary winding 50. The other end of secondary winding 50 is connected to the base of transistor 40. A light emitting diode of phototransistor 54 is coupled to a phase control regulator 56 which controls the base current in the phototransistor. The primary winding 46 is connected between the emitter of transistor 40 and the other output terminal.

A second controllable switch shown as a phototransistor 55 has its collector connected to the collector of transistor 42 and its emitter connected to one side of output winding 52. The other side of winding 52 is connected to the base of transistor 42. The light emitting diode of phototransistor 58 is coupled to a phase control regulator 50 which controls the base current in the phototransistor. Input winding 48 is connected between the emitter of transistor 42 and the other output terminal. A capacitor 62 is connected across the load terminal. The primary and secondary windings of transformer 44 have their relative plarities indicated by dots in accordance with the convention that when the primary winding terminal of winding 46 connected to the emitter of transistor 40 is positive the secondary winding terminal of winding 50 connected to the base of transformer 40 is also positive. Additionally, when the primary winding terminal of winding 48 which is connected to the other terminal of the load is positive, the secondary winding terminal of winding 52 connected to the emitter of phototransistor 48 is also positive. The configuration of the rectifier 70 and the n$^{th}$ rectifier 72 connected to the secondaries 36 and 38 respectively, are the same as the full-wave rectifier connected to secondary 34. Transistor 40 and 42 can be connected in an inverted mode. Primary winding 46 of current transformer 44 can be located between primary winding 34 and the emitter of phototransistor 54 as long as load current passes through winding 46 when transistor 40 is conducting. Primary winding 48 can be located between primary winding 34 and the emitter of phototransistor 55 as long as load current passes through winding 48 when transistor 42 is conducting.

The operation of FIG. 1 will now be explained. A source of alternating power is connected to the input of transformer 12 providing alternating voltage across the output of winding 13. The alternating power can be either a square wave or a sine wave voltage. When phototransistor 14 is off, no voltage is delivered to the load since the collector junction of transistor 20 and the collector junction of phototransistor 14 block one polarity of voltage while the reverse polarity is blocked by the emitter junction of transistor 20. Assuming the phase control regulator now continuously gates phototransistor 14 on, transistor 20 blocks voltage when its collector terminal is negative but when its collector terminal becomes positive due to a change in the polarity of the alternating voltage, current initially passes through the phototransistor, the output winding of the current transformer, the base-emitter junction of transistor 20, the input winding of the current transformer 16 and the load. Once this initial condition exists, transistor 20 turns on delivering higher current to the load.

A regenerative proportional base drive to transistor 20 then follows due to the current transformer action of transformer 16 with the result that transistor 20 is driven into hard saturation. By controlling the point in the supply voltage waveform where the phototransistor in each rectifier circuit is turned on using the phase control regulator, the power delivered to the loads and hence the output voltages can be independently controlled. The equivalent diode diode drop of the half-wave rectifier measured from the output of transformer 12 to the load is typically 0.44 volts which is at least as good as a high current Schotky diode. This voltage drop assumes a turn ratio of 0.1 of the primary to secondary winding of the transformer 16. Thus, high efficiency as well as gate controlled action of the multiple output is possible. When the voltage on winding 13 reverses, the emitter junction of transistor 20 blocks voltage for that half cycle. During the next half cycle power is delivered to the load after a turn on delay introduced by the phase control regulator 18. The turn-on delay is dependent on the power requirement of the load.

The operation of FIG. 2 will now be explained. A full-wave rectifier is shown using two transistor rectifiers connected to each secondary of transformer 32. Since only one transistor in each full-wave rectifier conducts at a time, a single current transformer with multiple windings can be used. The phototransistors 54 and 55 are alternately gated by the phase controlled regulators 56 and 60 to control the point in the supply waveform where the phototransistors turn on. The alternating source can have either a square wave or a sine wave voltage waveform. During a half phase of the alternating power supply when the end of secondary winding 34 connected to phototransistor 54 is positive and phototransistor 54 is on, positive current initially passes through phototransistor 54, current transformer secondary winding 50, transistor 40 base-emitter junction, current transformer secondary 46 and to the load. Once this initial condition exists transistor 40 turns on delivering higher current to the load. A regenerative proportional base drive to transistor 40 then follows due to the current transformer action of transformer 44, with the result that transistor 40 is driven into hard saturation. When the next half phase begins the end of secondary 34 connected to phototransistor 55 becomes positive and transistor 42 is turned on in the same manner as transistor 40. Transistor 40 has its base-emitter junction reversed biased by the load voltage and turns off. A multiplicity of full-wave rectifiers connected to a multiplicity of secondary windings can be used, all excited by a single alternating power source to obtain numerous isolated outputs with independent regulation.

It is understood that the foregoing detailed description is given merely by way of illustration and many modifications can be made therein without departing from the spirit or scope of the present invention.

What I claim as new and desire to secure by Letters Patent of the United States is:

1. A high efficiency half-wave rectifier supplying at least one external load comprising:
   a first transformer having a secondary winding for each load, and a primary winding adapted to be connected to an external alternating power source, one side of each of said secondary windings being connected to one side of the corresponding load;
   a second transformer for each load to be supplied having a primary and a secondary winding;

controllable switch means connected between the other side of said secondary winding of each of said first transformers and one side of said secondary winding of each of said second transformers;

a transistor for each load to be supplied having a base, a collector and an emitter, the collector and emitter being connected in series between the other side of said secondary windings of each of said first transformers and each of said external loads, the base being connected to the other side of said secondary winding of each of said second transformers, the primary windings of each of said second transformers being connected in series between the secondary winding of each of said first transformers and each of said loads so that when load current is passing through said primary windings of each of said second transformers when each of said switch means is closed, current is caused to flow by transformer action in the secondary of each of said second transformers driving each of said transistors into hard saturation; and phase control regulator means for controlling the turn-on of each of said controllable switch means to control the power delivered to each of the external loads individually.

2. A high efficiency full-wave rectifier supplying at east one external load comprising:

a first transformer having center tapped secondary windings for each of said loads, and a primary winding adapted to be connected to a source of alternating power, said center tapped winding being connected to one side of the corresponding load;

a second transformer for each load to be supplied having a first and second primary winding and a first and second secondary winding;

first controllable switch means for each load to be supplied connected between one side of each of said secondary windings of said first transformer and one side of each of the first secondary windings of said second transformer;

a first transistor for each load to be supplied having a base, a collector and an emitter, the collector and emitter being connected in series between one side of said secondary winding of each of said first transformers and the other side of each of said loads, the base being connected to the other side of said first secondary winding of each of said second transformers, the first primary winding of each of said second transformers being connected in series between one side of said secondary winding of each of said first transformers and the other side of each of said loads so that when load current is passing through the first primary winding of each of the second transformers when each of said first controllable switch means is closed, current is caused to flow by transformer action in the first secondary of each of said second transformers, driving each of said first transistors into hard saturation;

second controllable switch means for each load to be supplied connected between the other side of each of said secondary windings of said first transformer and one side of each of the second secondary windings of said second transformer;

a second transistor for each load to be supplied having a base, a collector and an emitter, the collector and emitter being connected in series between the other side of said secondary winding of each of said first transformers and the other side of each of said loads, the base being connected to the other side of said secondary winding of each of said second transformers, the second primary winding of said second transformer being connected in series between the other side of said secondary winding of each of said first transformers and the other side of said load so that when load current is passing through the secondary primary winding of each of said second transformers when each of said second controllable switch means is closed, current is caused to flow by transformer action in the secondary of each of said second transformers driving said second transistor into hard saturation;

first phase control regulator means for controlling the turn-on of each said first controllable switch means to individually control the power delivered to each load during a half-wave of the input power source; and second phase control regulator means for controlling the turn-on of each of said second controllable switch means to individually control the power delivered to each load during the other half-wave of the input power source.

* * * * *